United States Patent Office 3,455,158
Patented July 15, 1969

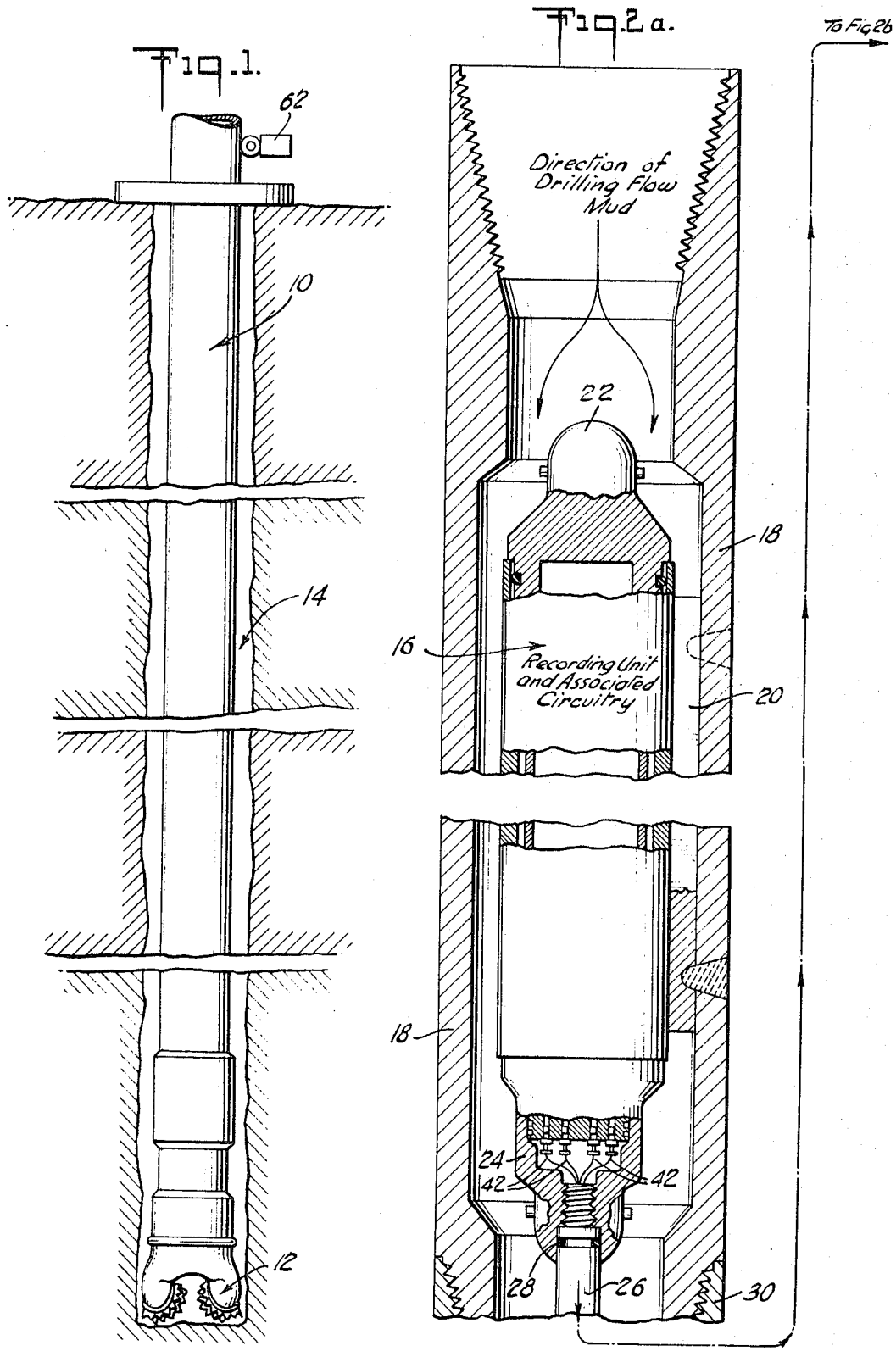

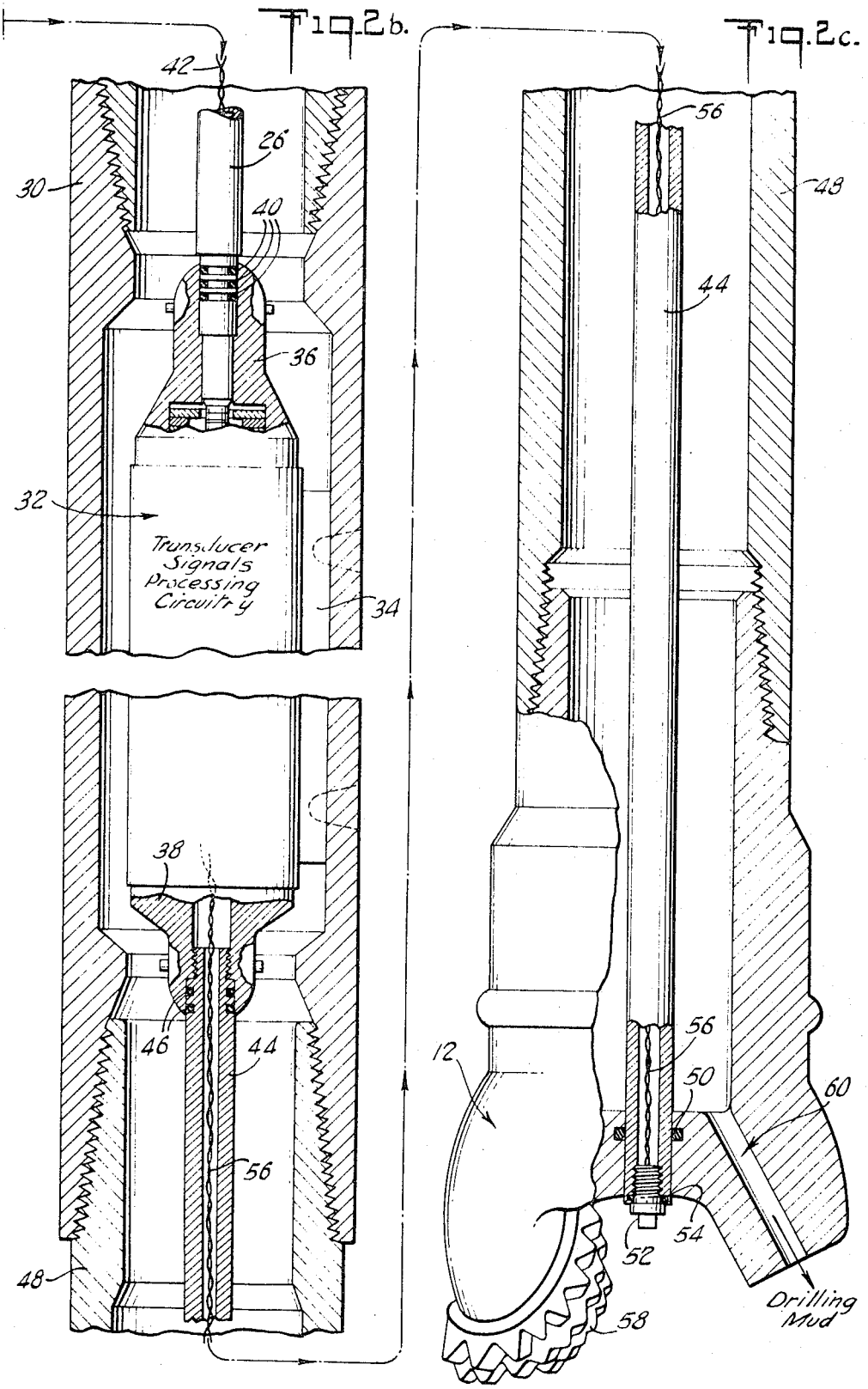

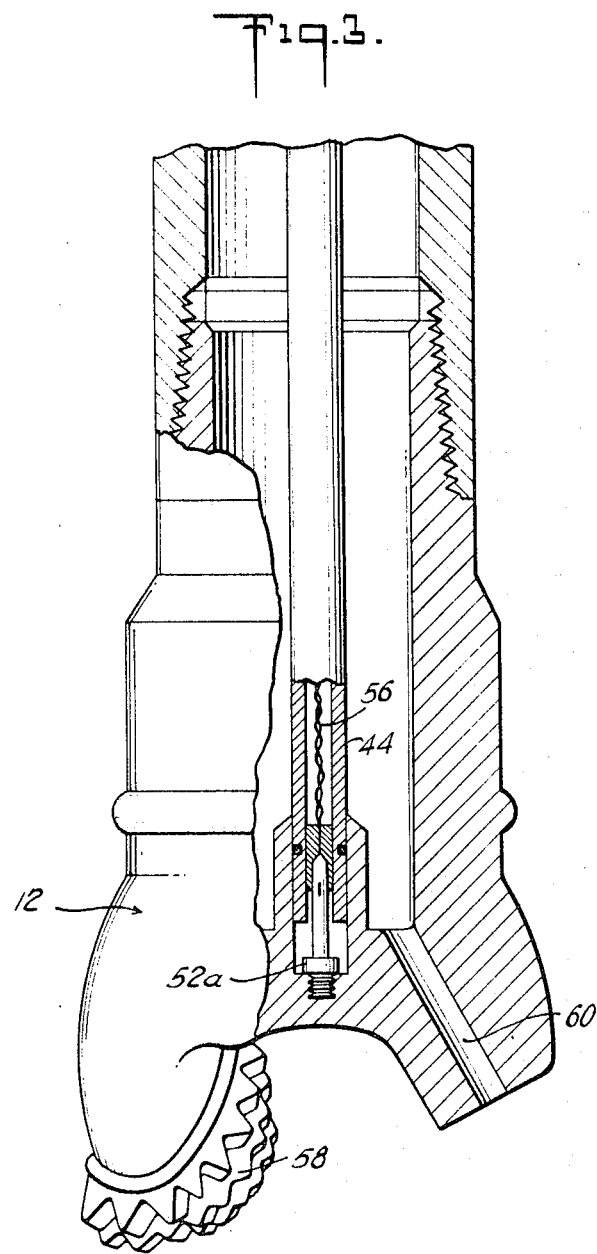

3,455,158
LOGGING WHILE DRILLING SYSTEM
Albert P. Richter, Jr., and Percy T. Cox, Houston, Tex., assignors to Texaco Inc., New York, N.Y., a corporation of Delaware
Filed Nov. 29, 1967, Ser. No. 686,567
Int. Cl. E21b 49/00
U.S. Cl. 73—154                    1 Claim

ABSTRACT OF THE DISCLOSURE

Apparatus for logging the temperature of a drill bit, drilling mud and earth formations while the drill bit penetrates various earth formations. Incorporated in the drill bit per se is a temperature transducer. The temperature transducer may, for example, be a thermocouple. Electrical signals representative of the temperature are transmitted to a transducer signal processing circuitry unit and then to a recording unit, said units being incorporated in the drill string above the drill bit.

BACKGROUND OF THE INVENTION

This invention pertains, in general, to a method and apparatus for logging an earth borehole, simultaneously with the drilling of the borehole if desired; and, more particularly, to apparatus for logging the temperature of a drill bit, the drilling mud and earth formations, even while the drill bit penetrates the various earth formations.

Ofter while seeking sub-surface oil, gas or minerals and the drilling of an earth borehole is in progress, it is necessary and desirable to both obtain and record measurements of various parameters in situ; i.e., the detection, measurement and recording are all done downhole in the borehole while the drilling is in progress. It would be particularly desirable to obtain a temperature-time history of the drilling mud temperature at the bit during the drilling operation. Some uses for such information fould be: (1) to determine drilling mud downhole temperatures in order to calculate mud flow parameters at the bit; (2) to obtain indications of formation temperatures by recording an ambient temperature at the bit without rotation of the bit or drilling mud circulation; a temperature log of the borehole being obtained by coming out of the borehole at a given rate; and (3) to determine whether the drilling through certain formations, such as a gas bearing formation, has an effect on the heat transfer characteristics of the formation, the drilling mud and the bit; such information being recorded as a temperature change in order to locate a particular formation.

SUMMARY OF THE INVENTION

One object of the invention is to provide a method and apparatus for determining temperatures of drilling mud, drill bit and various earth formations traversed by an earth borehole.

Another object of the invention is to determine temperatures of the drilling mud down in the borehole in order to ascertain mud flow parameters.

Another object of the invention is to ascertain temperatures of the various earth formations traversed by the borehole.

Another object of the invention is to locate various earth formations traversed by the borehole as a function of the heat transfer characteristics of the various formations.

Another object of the invention is to obtain a borehole temperature log during the drilling operation.

In accordance with one illustrative embodiment of the invention a temperature transducer is incorporated in a drill bit which is located at the lowermost end of the drill string. The transducer may, for example, be a thermocouple. Electrical signals representative of temperature of the drilling mud in the borehole, the drill bit, per se, and also representative of the temperatures of the various earth formations traversed by the borehole are transmitted to a transducer signal processing circuit and thence to a recording unit such as a magnetic tape recorder and circuitry associated therewith.

An important feature of the invention resides in the method of obtaining a temperature log of a mud-filled earth borehole comprising the steps of recording an ambient temperature in the borehole at a predetermined depth therein whilst both the drilling and mud flow is stopped; and withdrawing the drill string from the borehole at a predetermined rate and simultaneously recording temperatures correlated with the position of the drill bit in the borehole as said bit is being withdrawn therefrom.

Another important feature of the invention resides in the method of locating specific earth formations comprising the steps of recording the change in temperature as the rotating drill bit is penetrating the various earth formations; and correlating the recorded temperature differences with the position of the drill bit in the borehole as said bit is penetrating the various earth formations.

Another important feature of the invention resides in mounting the temperature transducer directly in the drill bit and not exposing it directly to the drilling mud. Advantageously this would be useful for correlating bit failure with formations, temperature, time and other downhole parameters. Such bit failures as locked rotary cones, plugged mud jets and bearing failures would provide a noticeable increase in the temperature of the bit itself. Moreover, temperature deviations dependent on formation characteristics could also be recorded.

Other objects and advantages as well as the various features of novelty which characterize the invention as pointed out with particularity in the claim annexed hereto and forming part of this specification. For a clearer understanding of the invention, its operating advantages and the specific objects attained by its use, reference should be had to the accompanying drawing figures and descriptive matter in which there is illustrated and described illustrative embodiments and practices of the invention.

BRIEF DESCRIPTION OF THE DRAWINGS

FIG. 1 is an elevation view showing a rotary drilling apparatus penetrating various earth formations during the drilling of an earth borehole; said apparatus including the logging apparatus in accordance with the present invention.

FIGS. 2a, 2b and 2c are cross-sectional elevation views of different sections of the lower end of the drilling apparatus of FIG. 1 and including the rotary drill bit of the apparatus; FIG. 2a showing the uppermost section, FIG. 2b the next lower section, and FIG. 2c the lowermost section below FIG. 2b.

FIG. 3 is a modification of the arrangement shown in FIG. 2c.

DETAILED DESCRIPTION OF THE INVENTION

In the drawing figures, like elements or components are designated by the same reference numbers throughout.

In FIG. 1 there is illustrated a drill string designated generally by the reference number 10, which drill string is made up of, among other things, a series of drill pipes coupled end-to-end. Located at the lowermost end of the drill string 10 is a conventional rotary drill bit designated generally by the reference number 12. As indicated in FIG. 1 drill bit 12 has rotatably drilled an earth borehole 14 which traverses various earth formations. Borehole 14 is filled with drilling fluid or drilling mud as it is often called.

Referring now to FIG. 2a there shown is a capsule designated generally by the reference number 16. As indicated by the label, capsule 16 houses a recording unit and associated circuitry. Capsule 16 is a sealed container adapted to withstand pressures of about 14,000 lbs. per square inch or more. As shown, recorder capsule 16 is mounted coaxially within a special sub 18 which is a drill collar that has been hollowed out for the purpose of receiving the capsule 16. Capsule 16 is supported within special sub 18 by means of a plurality of longitudinal members 20 or runners which are welded to the outside surface of capsule 16 along substantially the entire length thereof. The runners 20 are also welded to the special sub 18. Capsule 16 is closed at its upper and lower ends by two end caps 22 and 24, respectively, or bull plugs as they are often called. Details of the construction of capsule 16 are disclosed in more detail in U.S. patent application Ser. No. 674,335 entitled, "Logging While Drilling System," filed Oct. 10, 1967 in behalf of Albert P. Richter, Jr., and James D. Bruner.

As indicated in FIG. 2a, end cap 24 has a threaded aperture therethrough which receives a threaded conduit 26. The conduit 26 has an annular groove formed on the outside surface thereof and this groove contains a sealing O-ring 28.

Coupled to the lower end of the special sub 18 by means of conventional API tool threads is another special sub 30. Mounted coaxially within the special sub 30 is another sealed capsule 32. Capsule 32, as indicated by the labeling thereon, contains transducer signal processing circuitry. The capsule 32 is mounted on welded runners 34 to the special sub 30 in the same manner as capsule 16 is mounted by means of the runners 20 to the special sub 18. Capsule 32 is provided with two end caps or bull plugs 36 and 38, the end caps 36 and 38 being at the upper and lower ends of capsule 32, respectively. More details on the construction and arrangement of the capsule 32 is disclosed in U.S. patent application Ser. No. 674,335 filed Oct. 10, 1967, entitled, "Logging While Drilling System," in behalf of Albert P. Richter, Jr., and James D. Bruner.

End cap 36, as indicated in FIG. 2b, has an aperture therethrough which receives the conduit 26. At the point where conduit 26 enters the end cap 36 a plurality of annular grooves is formed on the outside surface of conduit 26 and these annular grooves are for the purpose of receiving the sealing O-rings 40. The conduit 26 carries therewithin the electrical conductors 42 which transmit signals from the transducer signals processing circuitry within capsule 32 to the capsule 16 which contains a recording unit (e.g. a magnetic tape recording unit) and associated circuitry.

As indicated in FIG. 2b, the end cap 38 has a threaded aperture therein which receives the end of a threaded conduit 44. At the point where conduit 44 enters the aperture in end cap 38 two annular grooves are provided in the outside surface of the conduit and these grooves receive the sealing O-rings 46.

Coupled by means of conventional API tool threads at the end of the special sub 30 is another special sub 48. Coupled to the lowermost end, as shown in FIG. 2c, of the special sub 48 by conventional API tool threads is the drill bit 12. As shown in FIGS. 2b and 2c, conduit 44 extends coaxially within the special sub 48 from end cap 38 through special sub 48 to the drill bit 12. The drill bit 12 which is illustrated in cross-section in FIG. 2c has a central opening formed therein for receiving the conduit 44. An annular space is formed in the drill bit for receiving an O-ring seal 50. The conduit 44 at the lowermost end thereof is internally threaded for receiving an externally threaded portion of a temperature transducer 52. Temperature transducer 52 may, for example, be a thermocouple element. Formed in an end of the conduit 44 is an annular space for receiving another sealing O-ring 54. As indicated electrical conductors 56 connected to the transducer 52 pass thorugh conduit 44 and into capsule 32 and are connected to the transducer signals processing circuitry. Signals emanating from capsule 32 pass via the conductors 42 through conduit 26 and into capsule 16 where they are connected to the recording unit and the associated circuitry therein.

Drill bit 12, as shown in FIG. 2c, is comprised of rotary cone cutters 58 and a plurality of apertures 60.

As indicated by the labeled arrows in FIG. 2a drilling mud flows downwardly through the drill string through special subs 18, 30 and 48 and ultimately outwardly through the apertures 60. Then the drilling mud returns upwardly in the earth borehole between the wall of the borehole and the outside surface of the drill string.

In accordance with the configuration shown in FIG. 2c wherein transducer 52 is in direct contact with the drilling mud, the actual drilling temperature of the mud can be determined.

With the apparatus shown more particularly at FIG. 2c, the determination of the temperatures of the various earth formations traversed by the drill bit may be determined by the following method:

After the drill bit 12 has penetrated and developed a borehole 14 to a given depth in the earth, traversing various earth formations, the rotation of drill bit 12 and drill string 10 is stopped and the circulation of the drilling mud is also stopped. Then the ambient temperature at the bit in the surrounding mud is detected, measured and recorded. Then the drill string 10 is withdrawn from the borehole 14 at a given rate measured by the velocity measuring apparatus 62 as shown in FIG. 1.

In order to determine heat transfer characteristics of the various formations, the drilling mud and the bit, the following method of using the apparatus particularly shown at FIG. 2c may be employed.

With the drill bit rotating and penetrating through various earth formations and with the mud circulating, the transducer 52 detects the various temperatures in correlation with the depth of the bit 12 in the borehole 14 and the various temperatures are recorded as the drilling progresses. The temperature log thus obtained would be helpful in locating particular formations such as, for example, gas bearing formations.

Another modification of the apparatus shown at FIG. 2c is shown in FIG. 3. In this instance the temperature transducer designated at 52a is not in direct contact with the drilling mud as in the case shown in FIG. 2c. Inasmuch as the temperature transducer 52a is housed entirely within the drill bit 12, the temperature of the drill bit itself is measured. This is useful for correlating bit failure with formations, temperature, time and other downhole parameters. Such bit failures as locked cones 58 (that is cones which do not rotate) and plugged jets can be determined as well as bearing failures which would cause a noticeable increase in the temperature of the bit itself. Also temperature deviations dependent on formation characteristics could be recorded.

While specific embodiments and practices of the invention have been shown and described in detail to illustrate the application of the principles of the invention, it is to be understood that the invention may be embodied otherwise without departing from such principles.

What is claimed is:

1. A method for obtaining a temperature log of an earth borehole while drilling the borehole comprising the steps of: rotating a drill string having a drill bit at the end thereof and penetrating various earth formations to define an earth borehole; simultaneously detecting, measuring and recording temperatures in the borehole during the drilling operation correlated with location of the bit.

References Cited
UNITED STATES PATENTS

| 2,741,468 | 4/1956 | Alspaugh | 175—39 |
| 2,914,947 | 12/1959 | Stegemeier | 73—154 X |
| 2,925,251 | 2/1960 | Arps | 175—39 |
| 3,327,527 | 6/1967 | Arps | 73—154 |

RICHARD C. QUEISSER, Primary Examiner

J. W. MYRACLE, Assistant Examiner

U.S. Cl. X.R.

175—39